2,734,815

HERBICIDES

David T. Mowry and Arthur H. Schlesinger, Dayton, Ohio, assignors to Monsanto Chemical Company, St. Louis, Mo., a corporation of Delaware No Drawing. Application June 28, 1951, Serial No. 234,144

17 Claims. (Cl. 71—2.5)

The present invention relates to herbicides and deals more particularly with methods for the general destruction of plants.

A number of herbicides are known, a variety of organic and inorganic compounds having been suggested in the prior art for use as plant killers. Among the disadvantages of known herbicides may be mentioned corrosive effect on equipment, water-insolubility (and hence the need of inflammable or obnoxious solvents), chemical reactivity with other components customarily employed in agricultural sprays or powders, instability when exposed for long periods of time to ordinary atmospheric conditions, etc.

Now we have found that highly stable, valuable herbicides are obtained by employing as the active ingredient a quaternary nitrogen compound having the general formula

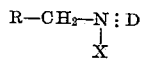

in which R is selected from the class consisting of alkyl-substituted phenyl radicals and alkyl-substituted naphthyl radicals in which the number of alkyl substituents is from 1 to 3, in which each alkyl radical has from 1 to 12 carbon atoms, and in which the total number of carbon atoms in the total alkyl radical is from 3 to 12, X is selected from the class consisting of chlorine and bromine, and N:D denotes a heterocyclic nitrogen compound of the pyridine series consisting of pyridine, quinoline and isoquinoline and C-linked homologues thereof containing from 1 to 3 C-alkyl substituents, the number of carbon atoms in each of said C-alkyl substituents being from 1 to 2.

The above general formula includes e. g., the 1-(monoalkylbenzyl)pyridinium chlorides or bromides, the 1-(dialkylbenzyl)pyridinium chlorides or bromides, the 1-(trialkyl)pyridinium chlorides or bromides, the 1-(naphthyl-methyl)pyridinium chlorides or bromides, the 1-(mono-alkylnaphthylmethyl)pyridinium chlorides or bromides, the 1-(dialkylnaphthylmethyl)pyridinium chlorides or bromides, the 1-(trialkylnaphthylmethyl)pyridinium chlorides or bromides, the 1-(mono-, di-, or trialkylbenzyl) quinolinium chlorides or bromides, the 1-(mono-, di-, or trialkylbenzyl)picolinium chlorides or bromides, the 1-(mono-, di-, or tri-alkylbenzyl)lepidinium chlorides or bromides, the 1-(mono-, di-, or trialkylbenzyl) - 2 - methyl - 5 - ethylpyridinium chlorides or bromides, the 1-(mono-, di-, or tri-alkylbenzyl) collidinium chloride or bromide; 1-(naphthylmethyl)pyridinium chloride or bromide, 1-(naphthylmethyl)quinolinium chloride, 1-(naphthylmethyl)picolinium chloride; 1-(naphthylmethyl)lepidinium chloride or bromide; and 1-(mono-, di-, or tri-alkylnaphthyl)pyridinium, quinolinium, picolinium or 2-methyl-5-ethylpyridinium chlorides or bromides in which the alkyl substituent has from 1 to 12 carbon atoms and in which the total number of carbon atoms in the alkyl substituents is from 3 to 12.

Compounds having the above formula are readily prepared by contacting a compound of the pyridine series with the appropriate alkylbenzyl halide. Preparation of the present compound is described in our copending application Serial No. 234,143, filed June 28, 1951 and now abandoned.

The present compounds are effective herbicides over wide ranges of concentrations. Their effectiveness may be measured by determining the inhibition of root growth as compared to similar untreated plants. The general usefulness of a herbicide may be measured by comparing the concentrations of a herbicide required to produce a certain inhibition of growth on a broad-leafed plant with the concentration of a herbicide required to produce the same inhibition of growth on a narrow leafed plant. For evaluation in many laboratories the cucumber has been adopted as a typical broad-leafed dicotyledonous plant for technical reasons, and wheat has been used as a standard narrow-leafed monocotyledonous plant. The general technique of evaluation of herbicides by growing seedlings in petri dishes has been described by Thompson, Swanson and Norman, Botanical Gazette, 107, 476–507 (1946).

The present invention is illustrated, but not limited, by the following example:

Example

Herbicidal activity of the present compounds was determined by germination of cucumber seeds and of wheat seeds for 4 days at a temperature of 76° F. in the presence of aqueous suspensions of each of the indicated chemicals at concentrations of 100 p. p. m. Fifty seeds were used for each test. The results are expressed as per cent length of the primary roots in the presence of the chemical compared with the length of the primary roots of controls which had been germinated in water. The activity of isopropyl carbanilate and of 2,4-dichlorophenoxy-acetic acid, as determined by the same test, are included for comparison.

| Compound Tested | Percent Growth at 100 Parts Per Million | |
|---|---|---|
| | Cucumber | Wheat |
| 1-(2,4-diethylbenzyl)pyridinium chloride | 5 | 4 |
| 1-(Amylmethylbenzyl)pyridinium chloride | 5 | 7 |
| 1-(Amylnaphthyl)methylpyridinium chloride | 6 | 11 |
| 1-(C₆–C₇ alkylbenzyl)pyridinium chloride | 4 | 12 |
| 1-(2,4,6-triethylbenzyl)pyridinium chloride | 5 | 10 |
| 1-(4-isopropylbenzyl)pyridinium chloride | 7 | 9 |
| 1-(4-sec-amylbenzyl)quinolinium chloride | 4 | 12 |
| 1-(Nonylbenzyl)pyridinium chloride | 3 | 3 |
| 1-[(4-sec-amylbenzyl)-2-methyl-5-ethyl]-pyridinium chloride | 4 | 7 |
| 1-(4-sec-butylbenzyl)pyridinium chloride | 4 | 13 |
| 1-(2,4-diisopropylbenzyl)pyridinium chloride | 3 | 5 |
| 1-(4-sec-amylbenzyl)pyridinium chloride | 4 | 2 |
| Isopropyl carbanilate | 14 | 2 |
| 2,4-Dichlorophenoxyacetic acid | 6 | 4 |

The herbicidal efficiency of the present compounds is surprising, for related compounds do not generally possess great herbicidal efficiency. When tested as described above, aqueous suspensions of a random group of such compounds were found to have the following effects:

| Compound Tested | Percent Growth at 100 Parts Per Million | |
|---|---|---|
| | Cucumber | Wheat |
| 1-(2-xylyl)pyridinium chloride | | |
| 1-Benzylpyridinium chloride | 32 | 22 |
| 1-(4-Ethylbenzyl)pyridinium chloride | 36 | |
| 1-(2-phenylethyl)pyridinium chloride | 23 | 16 |
| 1-(4-pyridyl)pyridinium dichloride | 67 | |
| 1-(Stearamidomethyl)pyridinium chloride | 95 | |
| 1-(Benzoylmethyl)pyridinium chloride | 92 | 94 |
| 1-n-Octyl-8-hydroxyquinolinium chloride | 82 | |
| 1-(2-Cyclohexylethyl)pyridinium chloride | 46 | |
| 1-(n-Cyloxymethyl)pyridinium chloride | 32 | 34 |
| 1-(Carbobutoxymethyl)pyridinium chloride | 46 | 80 |
| | 90 | 99 |

While many present herbicides are selective and useful against either broad-leafed or narrow-leafed plants, the present quaternary salts are almost equally effective against both classes of plants. This is especially advantageous where the destruction of all plant growth is desired.

Herbicidal compositions containing the present compounds may be water solutions or oil-in-water emulsions of the compounds. The solutions may be obtained simply by dissolving them in water in effective proportions. Dispersing of emulsifying agents are advantageously employed in the preparation of the herbicidal suspensions or emulsions and a wetting or penetrating agent is desirable in simple aqueous solutions. The present compounds are preferably applied by spraying aqueous suspensions or oil emulsion of the same, this method affording an easy and inexpensive way of destroying plant growth. However, they are likewise effective when applied in agricultural dusts; or they may be used with water-insoluble insecticides, fungicides, etc., in customarily employed organic solutions.

Because of the high herbicidal activity of the present compounds they are advantageously applied by mixing them with inert ingredients as carriers. Valuable herbicidal compositions are prepared by incorporating small amounts of the compounds into such carriers as water, hydrocarbon oils, organic solvents of the acids, dusts such as bentonite, pumice, etc. Sprays may also be prepared by dissolving the chemicals in oils or inorganic solvents to make concentrates and then adding small amounts of the concentrates to water, advantageously in the presence of an emulsifying or dispersing agent. Emulsions and dispersions thus prepared have the property of adhering to the plant foliage for a long period of time.

The aqueous solutions or oil-in-water emulsions may be used to destroy already existing plant growth by direct application to the undesirable plants, or they may be employed to prevent the plant growth by application to soils. When employed to prevent plant growth, for example in parking areas, highway abutments, railway yards, etc., they may be applied either as liquid sprays or dusts or they may be admixed with customarily employed temporary surfacing materials, e. g., oils, cinders, etc. The present invention thus provides a generally useful method of preventing and destroying undesirable plant growth.

What we claim is:

1. A herbicidal composition comprising an inert carrier and 1-(diethyl-benzyl)pyridinium chloride as the active ingredient, said chloride being present in phytocidal concentration in an oil-in-water emulsion.

2. A herbicidal composition comprising an inert carrier and 1-(p-sec-butylbenzyl)pyridinium chloride as the active ingredient, said chloride being present in phytocidal concentration.

3. A herbicidal composition comprising an inert carrier and 1-(4-nonylbenzyl)pyridinium chloride as the active ingredient, said chloride being present in phytocidal concentration in an oil-in-water emulsion.

4. A herbicidal composition comprising an inert carrier and 1-(2,4-diisopropylbenzyl)pyridinium chloride as the active ingredient, said chloride being present in phytocidal concentration in an oil-in-water emulsion.

5. The method of destroying undesirable plants which comprises applying to said plants a herbicidal composition containing as the active ingredient a quaternary nitrogen compound having the general formula

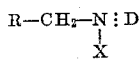

in which R is selected from the class consisting of alkyl-substituted phenyl radicals and alkyl-substituted naphthyl radicals in which the number of alkyl substituents is from 1 to 3, in which each alkyl radical has from 1 to 12 carbon atoms, and in which the total number of carbon atoms in the alkyl radicals is from 3 to 12, X is selected from the class consisting of chlorine and bromine, and N⋮D denotes a heterocyclic nitrogen compound of the pyridine series consisting of pyridine, quinoline and isoquinoline and C-linked homologues thereof containing from 1 to 3 C-alkyl substituents, the number of carbon atoms in each of the C-alkyl substituents being from 1 to 2, said active ingredient being present in phytocidal concentration.

6. The method of destroying undesirable plants which comprises applying to said plants an aqueous suspension of a quaternary nitrogen compound having the general formula

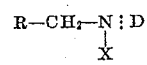

in which R is selected from the class consisting of alkyl-substituted phenyl radicals and alkyl-substituted naphthyl radicals in which the number of alkyl substituents is from 1 to 3, in which each alkyl radical has from 1 to 12 carbon atoms, and in which the total number of carbon atoms in the alkyl radicals is from 3 to 12, X is selected from the class consisting of chlorine and bromine, and N⋮D denotes a heterocyclic nitrogen compound of the pyridine series consisting of pyridine, quinoline and isoquinoline and C-linked homologues thereof containing from 1 to 3 C-alkyl substituents, the number of carbon atoms in each of the C-alkyl substituents being from 1 to 2, said nitrogen compound being present in phytocidal concentration.

7. The method of destroying undesirable plants which comprises applying to said plants a herbicidal composition containing as the active ingredient a 1-(alkylbenzyl)pyridinium chloride in which the alkyl radical has from 3 to 12 carbon atoms, said chloride being present in phytocidal concentration.

8. The method of destroying undesirable plants which comprises applying to said plants a herbicidal composition containing as the active ingredient a 1-(alkylbenzyl)quinolinium chloride in which the alkyl radical has from 3 to 12 carbon atoms, said chloride being present in phytocidal concentration.

9. The method of destroying undesirable plants which comprises applying to said plants a herbicidal composition containing as the active ingredient a 1-(dialkylbenzyl)pyridinium chloride in which the total number of carbon atoms in the total alkyl radicals is from 3 to 12, said chloride being present in phytocidal concentration.

10. The method of destroying undesirable plants which comprises applying to said plants a herbicidal composition containing 1-(2,4-diisopropylbenzyl)pyridinium chloride as the active ingredient, said chloride being present in phytocidal concentration.

11. The method of destroying undesirable plants which comprises applying to said plants a herbicidal composition containing 1-(diethylbenzyl)pyridinium chloride as the active ingredient, said chloride being present in phytocidal concentration.

12. The method of destroying undesirable plants which comprises applying to said plants a herbicidal composition containing 1-(p-sec-butylbenzyl)pyridinium chloride as the active ingredient, said chloride being present in phytocidal concentration.

13. The method of destroying undesirable plants which comprises applying to said plants a herbicidal composition containing 1-(4-nonylbenzyl)pyridinium chloride as the active ingredient, said chloride being present in phytocidal concentration.

14. A herbicidal composition comprising an oil-inwater emulsion of a quaternary nitrogen compound having the general formula:

$$R-CH_2-N\equiv D$$
$$\phantom{R-CH_2-N\equiv}|$$
$$\phantom{R-CH_2-N\equiv}X$$

in which R is selected from the class consisting of alkyl-substituted phenyl radicals and alkyl-substituted naphthyl radicals in which the number of alkyl substituents is from 1 to 3 in which each alkyl radical has from 1 to 12 carbon atoms, and in which the total number of carbon atoms in the alkyl radicals is from 3 to 12, X is selected from the class consisting of chlorine and bromine, and $N\equiv D$ denotes a heterocyclic nitrogen compound of the pyridine series consisting of pyridine, quinoline and isoquinoline and C-linked homologues thereof containing from 1 to 3 C-alkyl substituents, the number of carbon atoms in each of the C-alkyl substituents being from 1 to 2, said quaternary compound being present in said composition in a quantity which is toxic to plant life.

15. A herbicidal composition comprising a water-in-oil emulsion of a 1-(alkylbenzyl)pyridinium chloride in which the alkyl radical has from 3 to 12 carbon atoms, said chloride being present in said composition in a quantity which is toxic to plant life.

16. A herbicidal composition containing as the active ingredient a 1-(alkylbenzyl)quinolinium chloride, in which the alkyl radical has from 3 to 12 carbon atoms, said chloride being present in said composition in a quantity which is toxic to plant life.

17. A herbicidal composition comprising a water-in-oil emulsion of a 1-(dialkylbenzyl)pyridinium chloride, in which the total number of carbon atoms in the total alkyl radicals is from 3 to 12, said chloride being present in said composition in a quantity which is toxic to plant life.

References Cited in the file of this patent

UNITED STATES PATENTS

| | | |
|---|---|---|
| 2,501,209 | Craig | Mar. 21, 1950 |
| 2,554,192 | Byer et al. | May 22, 1951 |
| 2,556,664 | Smith et al. | June 12, 1951 |
| 2,626,244 | Fessler | Jan. 20, 1953 |
| 2,632,761 | Cheney | Mar. 24, 1953 |

FOREIGN PATENTS

| | | |
|---|---|---|
| 499,203 | Great Britain | Jan. 16, 1939 |
| 614,763 | Great Britain | Dec. 22, 1948 |